US009564082B2

(12) United States Patent
Qing et al.

(10) Patent No.: US 9,564,082 B2
(45) Date of Patent: Feb. 7, 2017

(54) ARRAY SUBSTRATE, DISPLAY DEVICE AND DRIVING METHOD THEREOF

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Haigang Qing, Beijing (CN); Xiaojing Qi, Beijing (CN)

(73) Assignees: BOE TECHNOLOGY GROUP CO., LTD. (CN); CHENGDU BOE OPTOELECTRONICS TECHNOLOGY CO., LTD. (CN)

( * ) Notice: Subject to any disclaimer, the term of this patent is extended or adjusted under 35 U.S.C. 154(b) by 175 days.

(21) Appl. No.: 14/370,979

(22) PCT Filed: Dec. 13, 2013

(86) PCT No.: PCT/CN2013/089417

§ 371 (c)(1),
(2) Date: Jul. 8, 2014

(87) PCT Pub. No.: WO2015/024338

PCT Pub. Date: Feb. 26, 2015

(65) Prior Publication Data

US 2015/0170572 A1 Jun. 18, 2015

(30) Foreign Application Priority Data

Aug. 22, 2013 (CN) .......................... 2013 1 0369639

(51) Int. Cl.

*G06F 3/038* (2013.01)
*G09G 5/00* (2006.01)
*G09G 3/32* (2016.01)

(52) U.S. Cl.

CPC .......... *G09G 3/3266* (2013.01); *G09G 3/3225* (2013.01); *G09G 3/3233* (2013.01);

(Continued)

(58) Field of Classification Search

CPC .. G09G 3/3266; G09G 3/3233; G09G 3/3225; G09G 2300/0861; G09G 2300/0819; G09G 2300/0852; G09G 2300/0223; G09G 2300/0233; G09G 2300/0876

See application file for complete search history.

(56) References Cited

U.S. PATENT DOCUMENTS

2006/0181333 A1* 8/2006 Holland .................. H02M 3/07 327/536
2008/0205469 A1* 8/2008 Imai ...................... H01S 5/0264 372/50.21

(Continued)

FOREIGN PATENT DOCUMENTS

CN 101075407 11/2007
CN 101609839 12/2009

(Continued)

OTHER PUBLICATIONS

International Search Report and Written Opinion issued in corresponding International Application No. PCT/CN2013/089417 dated.

(Continued)

*Primary Examiner* — Andrew Sasinowski
*Assistant Examiner* — Brent D Castiaux
(74) *Attorney, Agent, or Firm* — Bakerhostetler LLP.

(57) ABSTRACT

The present disclosure provides an array substrate, comprising a plurality of pixel circuits arranged in a matrix form. Each pixel circuit comprises a controlling sub-circuit, a compensating sub-circuit, a driving transistor and a light- (Continued)

emitting element. The controlling sub-circuit is configured to, under the control of a scanning voltage signal and a charging signal, charge the compensating sub-circuit, and under the control of a light-emitting controlling signal, control the driving transistor so as to drive the light-emitting element to emit light, and the compensating sub-circuit is configured to, under the control of the controlling sob-circuit, set a constant potential for a gate electrode of the driving transistor, and pre-store a threshold voltage of the driving transistor, so as to compensate for the threshold voltage of the driving transistor when the driving transistor drives the light-emitting element to emit light.

10 Claims, 9 Drawing Sheets

(52) U.S. Cl.
CPC ............... *G09G 2300/0819* (2013.01); *G09G 2300/0852* (2013.01); *G09G 2300/0861* (2013.01); *G09G 2300/0876* (2013.01); *G09G 2320/0223* (2013.01); *G09G 2320/0233* (2013.01)

(56) References Cited

U.S. PATENT DOCUMENTS

2009/0309503 A1* 12/2009 Kim .................... G09G 3/3233 315/169.3
2011/0205205 A1 8/2011 Yamamoto et al.
2014/0055434 A1* 2/2014 Chang .................. G09G 3/3233 345/208

FOREIGN PATENT DOCUMENTS

| | | |
|---|---|---|
| CN | 101609840 | 12/2009 |
| CN | 101980330 | 2/2011 |
| CN | 102956199 | 3/2013 |
| CN | 102982766 | 3/2013 |
| CN | 103035202 | 4/2013 |
| CN | 103035202 A * | 4/2013 |
| CN | 203397667 | 1/2014 |

OTHER PUBLICATIONS

Text of the Notification of the First Office Action, App. No. 201310369639.2, Jan. 7, 2015.

* cited by examiner

-PRIOR ART-

-PRIOR ART-

ARRAY SUBSTRATE, DISPLAY DEVICE AND DRIVING METHOD THEREOF

CROSS-REFERENCE TO RELATED APPLICATION

This application is the U.S. national phase of PCT Application No. PCT/CN2013/089417 filed on Dec. 13, 2013, which claims priority to Chinese Patent Application No. 201310369639.2 filed on Aug. 22, 2013, the disclosures of which are incorporated in their entirety by reference herein.

FIELD OF THE INVENTION

The present disclosure relates to the field of display technology, in particular to a pixel circuit. Its driving method, as array substrate and a display device.

DESCRIPTION OF THE PRIOR ART

An active matrix organic light-emitting diode (AMOLED) display has been widely used recently because it can meet the requirements of a high-resolution and large-size display device.

For an AMOLED, a thin film transistor (TFT) generates a driving current in a saturation, state so as to drive a light-emitting element, such as an organic light-emitting diode (OLED), to emit light. The brightness of the OLED is in direct proportion to a size of the driving current provided to the OLED, so a large driving current is required so as to achieve an optimal display effect. Because low-temperature polysilicon (LTPS) can provide high electron mobility, it is usually used to manufacture the TFT for the AMOLED.

FIG. 1A shows an existing pixel circuit for a threshold-compensating AMOLED. The circuit comprises two TFTs, a capacitor, a power supply and an OLED. The TFTs include T1 that is used as a switch and a driving TFT (DTFT) used for driving pixels. VDD represents a high level of a power voltage, and VSS represents a low level of the power voltage. FIG. 1B is a sequence diagram of a control signal for the pixel circuit in FIG. 1A. VScan represents a level outputted from a scanning signal line and Vdata represents a level outputted from a data signal line. When VScan is a low level, T1 is turned on and the capacitor C is charged by a grayscale voltage from the data signal line. When VScan is a high level, T1 is turned off and the grayscale voltage is stored in the capacitor C. VDD is relatively high, so DTFT is in a saturation state, and the driving current for the OLED is $I=K(V_{sg}-|V_{th}|)^2=K(VDD-V_{data}-|V_{th}|)^2$, wherein Vdata represents the data voltage, VDD represents the power voltage, K represents a constant associated with a size of the transistor and carrier mobility, and Vth represents a threshold voltage of the transistor. According to the above equation, the size of the driving current for the OLED is associated with Vth. The LTPS process is immature, and the TFT manufactured thereby will have different threshold voltages, even with the same process parameters. As a result, at different positions of an array substrate, the threshold voltages of the TFT will be different and thereby the driving currents for the OLED at the same grayscale voltage will be different too. Hence, if the pixel circuit as shown in FIG. 1A is used, the brightness at different positions of the array substrate will be different from each other, and uneven display will occur, and thereby the brightness uniformity of the array substrate will be reduced.

SUMMARY OF THE INVENTION

An object of the present disclosure is to provide a pixel circuit, its driving method, an array substrate and a display device, so as to prevent poor brightness uniformity and uneven display for the array substrate in an existing pixel circuit.

In one aspect, the present disclosure provides a pixel circuit, comprising a controlling sub-circuit, a compensating sub-circuit, a driving transistor and a light-emitting element. The controlling sub-circuit is configured to, under the control of a scanning voltage signal and a charging signal, charge the compensating sub-circuit, and under the control of a light-emitting controlling signal, control the driving transistor so as to drive the light-emitting element to emit light. The compensating sub-circuit is configured to, under the control of the controlling sub-circuit, set a constant potential for a gate electrode of the driving transistor, and pre-store a threshold voltage of the driving transistor, so as to compensate for the threshold voltage of the driving transistor when the driving transistor drives the light-emitting element to emit light.

In the present disclosure, the compensating sub-circuit sets the constant potential for the gate electrode of the driving transistor and pre-stores the threshold voltage of the driving transistor, so as to compensate for the threshold voltage of the driving transistor in a better manner than the conventional methods when the driving transistor drives the light-emitting element to emit light. As a result the driving current for driving the light-emitting element to emit light is irrelevant to the threshold voltage of the driving transistor, and it is able to improve the display uniformity of a display panel.

Further, the compensating sub-circuit may comprise a first capacitor and a second capacitor. A first end of the first capacitor is coupled to the gate electrode of the driving transistor and the controlling sub-circuit, and a second end thereof is coupled to a source electrode of the driving transistor. A first end of the second capacitor is coupled to a source electrode of the driving transistor, and a second end thereof is coupled to the controlling sub-circuit. The second capacitor is charged under the control of the controlling sub-circuit, so that a potential for a source electrode of the driving transistor increases to a potential capable of automatically turning off the driving transistor, and the first capacitor pre-stores the threshold voltage capable of automatically turning off the driving transistor.

In the present disclosure, the second capacitor is charged by connecting the source electrode of the driving transistor to the first and second capacitors, so that the potential for the source electrode of the driving transistor increases to the potential capable of automatically turning off the driving transistor and the first capacitor pre-stores the threshold voltage. As a result; it is able to store the threshold voltage of the driving transistor to the source electrode of the driving transistor and compensate for the threshold voltage thereof in a better manner than the conventional methods.

Further, the controlling sub-circuit may comprise a charging module, a light-emitting controlling module and a voltage source. The charging module is coupled to a first end of the voltage source, the gate electrode of the driving transistor and fire first end of the first capacitor. The light-emitting controlling module is coupled to a second end of the voltage source and the source electrode of the driving transistor.

The charging module may be configured to receive a voltage source signal and a reference voltage signal for setting the constant potential for the gate electrode of the driving transistor so as to charge the second capacitor, so that the potential for the source electrode of the driving transistor increases to the potential capable of automatically turning off the driving transistor, and the first capacitor pre-stores the threshold voltage capable of automatically turning off the driving transistor when the potential for the source electrode of the driving transistor increases to the potential capable of automatically turning off the driving transistor. The charging module may be further configured to receive a data voltage signal for driving the light-emitting element to emit light, so as to control the first capacitor to store a data voltage by the first capacitor. The light-emitting controlling module may be configured to, under the control of the light-emitting controlling signal, receive the voltage source signal and control, the driving transistor so as to drive the light-emitting element to emit light.

In the present disclosure, the controlling sub-circuit may comprise the charging module and the light-emitting controlling module, the first and second capacitors of the compensating sub-circuit are charged by the charging module, and the light-emitting controlling module controls the driving transistor so as to drive the light-emitting element to emit light. As a result, it is able to provide a simple circuit.

Further, the charging module may comprise a first switch transistor, a first gate signal source for outputting the charging signal, a second switch transistor, a second gate signal source for outputting the scanning voltage signal, a voltage source, a data signal source, and a reference signal source. A gate electrode of the first switch transistor is coupled to the first gate signal source, a drain electrode thereof is coupled to a first end of the voltage source, and a source electrode thereof is coupled to a drain electrode of the driving transistor. A gate electrode of the second switch transistor is coupled to the second gate signal source, a drain electrode thereof is coupled to the data signal source and the reference signal source, and a source electrode thereof is coupled to the gate electrode of the driving transistor and the first end of the first capacitor.

In the present disclosure, the charging module may comprise the first switch transistor, the first gate signal source for outputting the charging signal, the second switch transistor, the second gate signal source for outputting the scanning voltage signal, the voltage source, a data signal source, and the reference signal source. As a result, it is able to charge the first and second capacitors with a simple circuit.

Further, the light-emitting controlling module may comprise a third switch transistor and a third gate signal source for outputting the light-emitting controlling signal. A gate electrode of the third switch transistor is coupled to the third gate signal source, a source electrode thereof is coupled to the second end of the voltage source and the second end of the second capacitor, and a drain electrode thereof is coupled to the source electrode of the driving transistor and the first end of the second capacitor.

In the present disclosure, the light-emitting controlling module may comprise the third switch transistor and the third gate signal source for outputting the light-emitting controlling signal. As a result, it is able to control the driving transistor so as to drive the light-emitting element to emit light with a simple circuit.

Further, the first, second and third switch transistors may be all P-type TFTs or N-type TFTs. In the pixel circuit, the transistors may be of the same type, so the manufacturing process is simple.

Further, the first and third switch transistors may be of the same type, while the second switch transistor may be of a different, type from the first and third switch transistors. The second gate signal source may be identical to the third gate signal source. As a result, it is able to reduce the number of the controlling signals, and to control different switch transistors with the same controlling signal.

Further, the data signal source and the reference signal source may be outputted via an identical signal terminal. As a result, it is able to transfer the data voltage signal and the reference voltage signal by the same signal source in a time-sharing manner, thereby to reduce the number of the signal sources.

In another aspect, the present disclosure provides an array substrate comprising the above-mentioned pixel circuit.

In yet another aspect, the present disclosure provides a display device comprising the above-mentioned array substrate.

According to the array substrate and the display device of the present disclosure, the pixel circuit comprises the controlling sub-circuit, the compensating sub-circuit, the driving transistor and the light-emitting element. The compensating sub-circuit sets the constant potential for the gate electrode of the driving transistor and pre-stores the threshold voltage of the driving transistor, so as to compensate for the threshold voltage of the driving transistor in a better manner than the conventional methods when the driving transistor drives the light-emitting element to emit light. As a result, the driving current for driving the light-emitting element to emit light is irrelevant to the threshold voltage of the driving transistor, and it is able to improve the display uniformity of the display panel.

In yet another aspect, the present disclosure provides a method for driving a pixel circuit, comprising:

charging by a controlling sub-circuit, under the control of a scanning voltage signal and a charging signal, a compensating sub-circuit, so that the compensating sub-circuit sets a constant potential for a gate electrode of a driving transistor and pre-stores a threshold voltage of the driving transistor; and compensating by the controlling sub-circuit, under the control of a light-emitting controlling signal, for a threshold voltage of the driving transistor with the pre-stored threshold voltage and controlling the driving transistor so as to drive a light-emitting element to emit light.

In the present disclosure, the controlling sub-circuit controls the compensating sub-circuit to set the constant potential for the gate electrode of the driving transistor and pre-store the threshold voltage of the driving transistor, so as to compensate for the threshold voltage of the driving transistor in a better manner than the conventional methods when the driving transistor drives the light-emitting element to emit light. As a result, the driving current for driving the light-emitting element to emit light is irrelevant to the threshold voltage of the driving transistor, and it is able to improve the display uniformity of the display panel.

Further, the compensating sub-circuit may comprise a first capacitor and a second capacitor, and the step of charging the compensating sub-circuit so that the compensating sub-circuit sets the constant potential for the gate electrode of the driving transistor and pre-stores the threshold voltage of the driving transistor may comprise:

inputting, by the controlling sub-circuit, a reference voltage to the gate electrode of the driving transistor for setting the constant potential, and controlling the second capacitor coupled to a source electrode of the driving capacitor to be charged, so that a potential for the source electrode of the driving transistor increases to a potential capable of automatically turning off the driving transistor and die first capacitor stores the threshold voltage of the driving transistor.

In the present disclosure, the second capacitor is charged by connecting the source electrode of the driving transistor to the first and second capacitors, so that the potential for the source electrode of the driving transistor increases to the potential capable of automatically turning off the driving transistor and the first capacitor pre-stores the threshold voltage. As a result, it is able to store the threshold voltage of the driving transistor to the source electrode of the driving transistor and compensate the threshold voltage thereof in a better manner than the conventional methods.

DETAILED DESCRIPTION OF THE PREFERRED EMBODIMENTS

The technical solutions of the present disclosure will be clearly and completely described hereinafter in conjunction with the drawings and the embodiments. Obviously, the following embodiments are merely a part of, rather than all of, embodiments of the present disclosure, and any other embodiments obtained by a person skilled in the art without any creative efforts shall also fall within the scope of the present disclosure.

Switch transistors and driving transistors used in the embodiments of the present disclosure may be TFTs, FETs or any other elements with the same characteristics. The transistor has symmetrical source and drain electrodes, so they may be replaced with each other. In these embodiments, in order to distinguish the electrodes other than the gate electrode, one of them is called as source electrode and the other is called as drain electrode.

It is to be appreciated that, when element A is "coupled" to element B, it may mean that A is directly connected to B, or there may be any other element between A and B (i.e., A may be indirectly connected to B, e.g., A is connected to B via element C). When A is "directly" coupled to B, it means that there is no other element between A and B.

First Embodiment

Figure 1A:
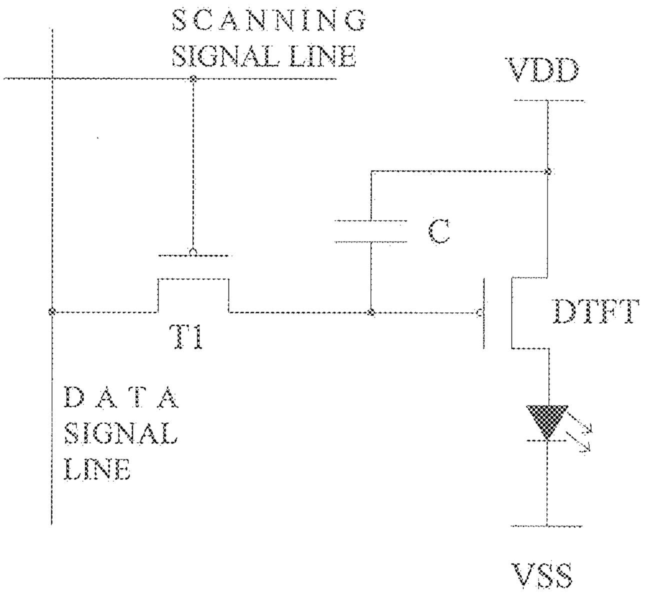
FIG. 1A is a schematic view showing an existing pixel circuit.
Figure 1B:
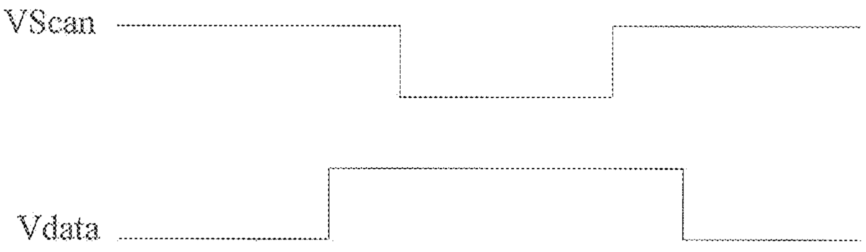
FIG. 1B is a sequence diagram of the existing pixel circuit.
Figure 2A:
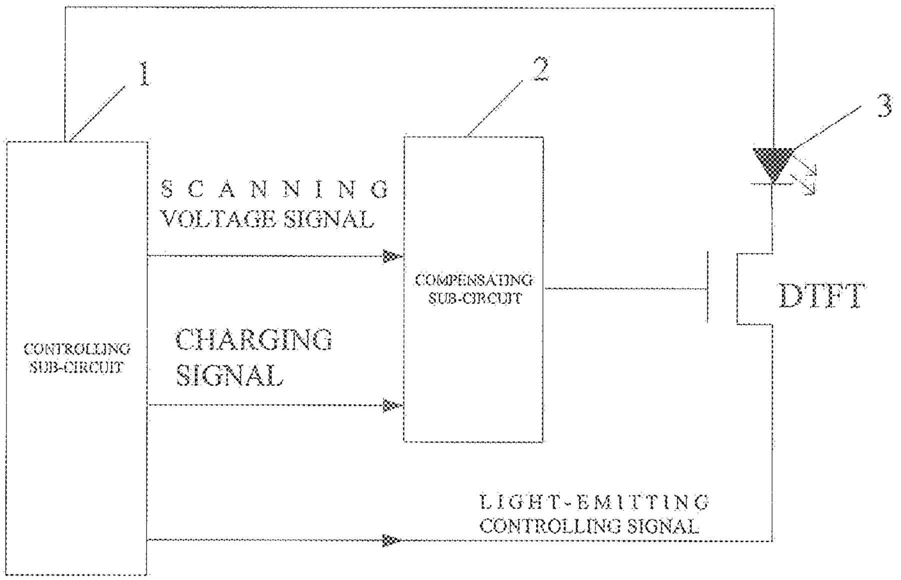
FIG. 2A is a schematic view showing a pixel circuit according to one embodiment of the present disclosure.

Referring to FIG. 2A, a pixel circuit comprises a controlling sub-circuit 1, a compensating sub-circuit 2, a driving transistor DTFT and a light-emitting element 3. The controlling sub-circuit 1 is configured to, under the control of a scanning voltage signal and a charging signal, charge the compensating sub-circuit 2, and under the control of a light-emitting controlling signal, control the driving transistor DTFT so as to drive the light-emitting element 3 to emit light.

The compensating sub-circuit 2 is configured to, under the control of the controlling sub-circuit 1, set a constant potential for a gate electrode of the driving transistor DTFT, and pre-store a threshold voltage of the driving transistor DTFT, so as to compensate for the threshold voltage of the driving transistor DTFT when the driving transistor DTFT drives the light-emitting element 3 to emit light.

To be specific, in this embodiment, under the control of the scanning voltage signal and the charging signal, the controlling sub-circuit 1 charges the compensating sub-circuit 2, and sets the constant potential for the gate electrode of the driving transistor DTFT or controls the driving transistor DTFT to output a driving current so as to drive the light-emitting element 3 to emit light in accordance with different voltage signals inputted by the controlling sub-circuit 1 during the charging of the compensating sub-circuit 2. For example, when a reference voltage signal is inputted, the controlling sub-circuit 1 will set the constant potential for the gate electrode of the driving transistor DTFT and pre-store the threshold voltage of the driving transistor DTFT, and when a data voltage signal is inputted, the controlling sub-circuit 1 will control the driving transistor DTFT to output the driving current.

In this embodiment, the light-emitting element may be, for example, an OLED. In FIG. 2A, the pixel circuit is described by taking OLED as an example.

Preferably, the compensating sub-circuit 2 includes a first capacitor C1 and a second capacitor C2. A first end of the first capacitor C1 is coupled to the gate electrode of the driving transistor DTFT and the controlling sub-circuit 1, and a second end thereof is coupled to a source electrode of the driving transistor DTFT. A first end of the second capacitor C2 is coupled to a source electrode of the driving transistor DTFT, and a second end thereof is coupled to the controlling sub-circuit 1.

Figure 2B:
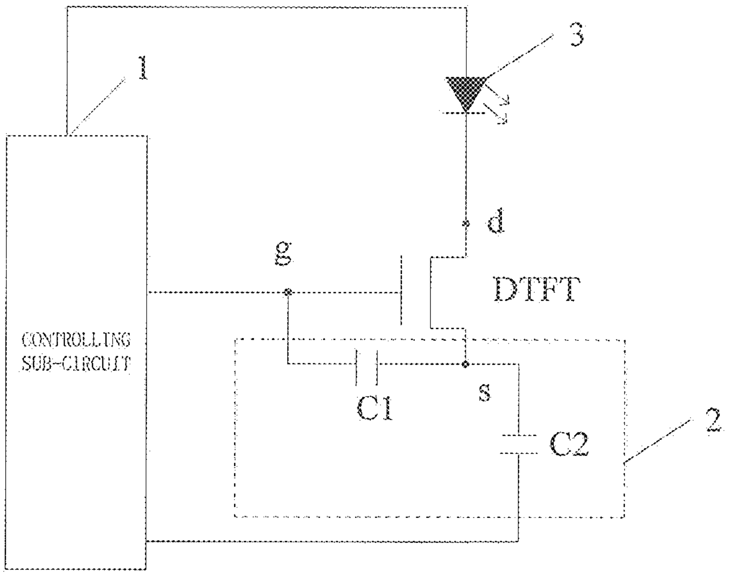
FIG. 2B is another schematic view showing the pixel circuit according to one embodiment of the present disclosure.

To be specific, as shown in FIG. 2B, the first end of the first capacitor C1 is coupled to the gate electrode of the driving transistor DTFT, i.e., node g, and the controlling sub-circuit 1, and the second end thereof is coupled to the source electrode of the driving transistor DTFT, i.e., node s. The first capacitor C1 is arranged between the gate electrode and the source electrode of the driving transistor DTFT. The first end of the second capacitor C2 is coupled to the source electrode of the driving DTFT, i.e., node s, and the second end thereof is coupled to the controlling sub-circuit 1. The light-emitting element 3 is coupled to a drain electrode of the driving transistor DTFT, i.e., node d, so as to drive the light-emitting element 3 to emit light when the driving current is outputted from the drain electrode of the driving transistor DTFT.

Further, the controlling sub-circuit 1 controls the second capacitor C2 to be charged, so that a potential for the source electrode of the driving transistor DTFT increases to a potential capable of automatically turning off the driving transistor DTFT, and the first capacitor C1 pre-stores the threshold voltage capable of automatically turning off die driving transistor DTFT when the potential for the driving transistor DTFT increases to the potential capable of automatically turning off the driving transistor DTFT.

To be specific, in this embodiment, when the controlling sub-circuit 1 controls the second, capacitor C2 to be charged, the potential for the source electrode is pre-stored as the potential capable of automatically turning off the driving transistor DTFT, and the threshold voltage of the driving transistor DTFT is stored by the first capacitor C1. When the driving transistor DTFT drives the light-emitting element 3 to emit light, the threshold voltage of the driving transistor DTFT is compensated by the threshold voltage of the driving transistor DTFT pre-stored in the capacitor C1. As a result, the driving current for driving the light-emitting element to emit light is irrelevant to the threshold voltage of the driving transistor DTFT, and it is able to improve the display uniformity of a display panel.

Figure 2C:
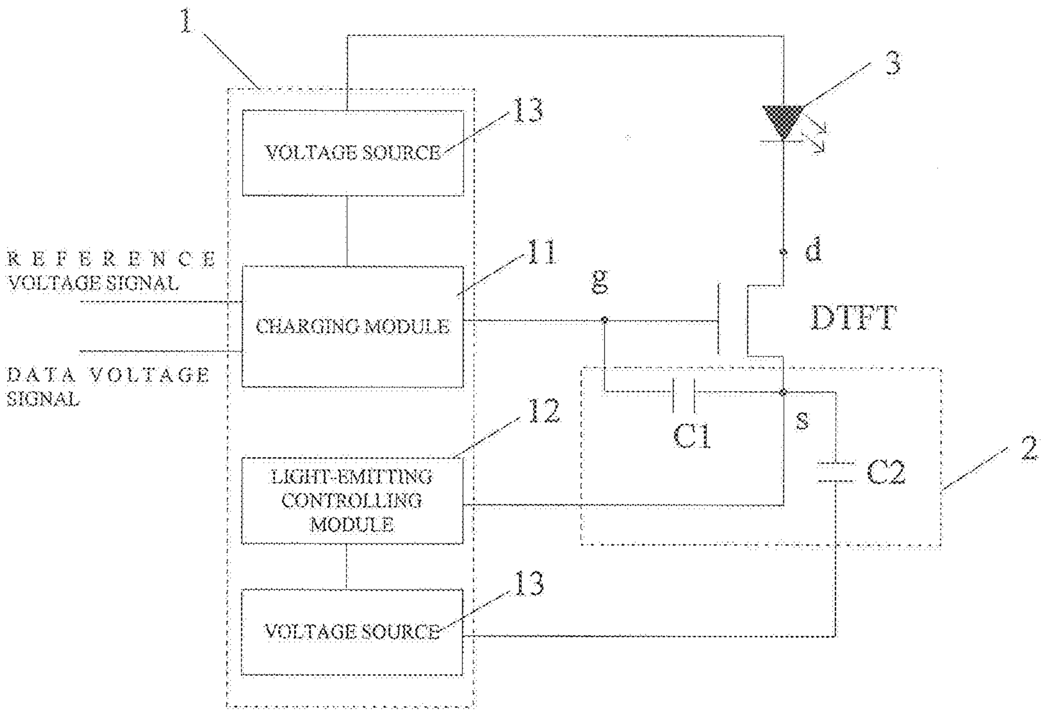
FIG. 2C is yet another schematic view showing the pixel circuit according to one embodiment of the present disclosure.

Preferably, in this embodiment, the controlling sub-circuit 1 includes a charging module 11, a light-emitting controlling module 12 and a voltage source 13. The charging module 11 is coupled to the voltage source 13, the gate electrode of the driving transistor and the first end of the first capacitor C1. The light-emitting controlling module 12 is coupled to the voltage source 13, the driving transistor DTFT and the second capacitor C2. In this embodiment, the voltage source 13 coupled to the charging module 11 and the voltage source 13 coupled to the light-emitting controlling module 12 are different output ends of the voltage source, and there is a predetermined voltage difference between the voltages outputted from the output ends, so as to drive the light-emitting element, as shown in FIG. 2C.

To be specific, the charging module 11 is configured to, under the control of the scanning voltage signal and the charging signal, receive a voltage source signal from the voltage source 13 and a reference voltage signal for setting the constant potential for the gate electrode of the driving transistor DTFT so as to charge the second capacitor C2, so that the potential for the source electrode of the driving transistor DTFT increases to the potential capable of automatically turning off the driving transistor DTFT, and the first capacitor C1 pre-stores the threshold voltage capable of automatically turning off the driving transistor DTFT when the potential for the source electrode of the driving transistor DTFT increases to the potential capable of automatically turning off the driving transistor DTFT.

Further, the charging module 11 is further configured to, under the control of the scanning voltage signal and the charging signal, receive a data voltage signal for driving the light-emitting element 3 to emit light, so as to control the first capacitor C1 to store the data voltage and control the driving transistor DTFT to output the driving current.

The light-emitting controlling module 13 is configured to, under the control of the light-emitting controlling signal, receive the voltage source signal and control the driving transistor DTFT so as to drive the light-emitting element 3 to emit light.

To be specific, in this embodiment, when the controlling sub-circuit 1 controls the second capacitor C2 to be charged, the potential for the source electrode is pre-stored as tire potential capable of automatically turning off the driving transistor DTFT and the threshold voltage of the driving transistor DTFT and the data voltage for driving the light-emitting element to emit light are stored by the first capacitor C1. The threshold voltage of the driving transistor DTFT is compensated by the threshold voltage of the driving transistor DTFT pre-stored by the first capacitor C1, and the drain electrode of the driving transistor DTFT is driven by the data voltage stored by the first capacitor C1 so as to output the driving current, thereby to drive the light-emitting element 3 to emit light.

In FIGS. 2B and 2C, the driving transistor DTFT is an N-type TFT, but it is not particularly defined in the present disclosure. For example, the driving transistor DTFT in this embodiment may also be a P-type TFT.

In this embodiment, the pixel circuit comprises the controlling sub-circuit, the compensating sub-circuit, the driving transistor and the light-emitting element. The compensating sub-circuit includes the first and second capacitors, and the controlling sub-circuit controls the first and second capacitors to be charged. When the second capacitor is charged, the potential for the source electrode is pre-stored as the potential capable of automatically turning off the driving transistor, and the threshold voltage of the driving transistor DTFT is stored by the first capacitor. In addition, the first capacitor is charged so that the data voltage for driving the light-emitting element to emit light is stored by the first capacitor. The controlling sub-circuit drives the driving transistor to output the driving current so as to drive the light-emitting element to emit light. The threshold voltage of the driving transistor DTFT is compensated by the threshold voltage of the driving transistor DTFT pre-stored by the first capacitor. As a result, the driving current for driving the light-emitting element to emit light is irrelevant to the threshold voltage of the driving transistor, and it is able to improve the brightness uniformity of an image in an array substrate.

Second Embodiment

In this embodiment, the pixel circuit of the first embodiment will be described in conjunction with the practical applications. Of course, the present invention is not limited thereto.

The charging module of the controlling sub-circuit 1 includes a first gate signal source S1 for outputting the charging signal, a first switch transistor T1, a second gate signal source S2 for outputting the scanning voltage signal, a second switch transistor T2, a reference signal source and a data signal source D1.

To be specific, the first gate signal source S1 for outputting the charging signal controls ON and OFF states of the first switch transistor T1, and the second gate signal source S2 for outputting the scanning voltage signal controls ON and OFF states of the second switch transistor T2.

Further, the voltage source 13 includes a first end and a second end. Between the first and second ends of the voltage source, there is a predetermined voltage difference sufficient to drive the light-emitting element to emit light. In this embodiment, the first end of the voltage source is a high level VDD, and the second end thereof is a low level VSS. A gate electrode of the first switch transistor T1 is coupled to the first gate signal source S1, a drain electrode thereof is coupled to the first end of the voltage source, i.e., VDD, and a source electrode thereof is coupled to the drain electrode of the driving transistor. The second end of the voltage source, i.e., VSS, is coupled to the second end of the second capacitor C2 so as to charge the second capacitor C2, as shown in FIG. 3A.

Figure 3A:
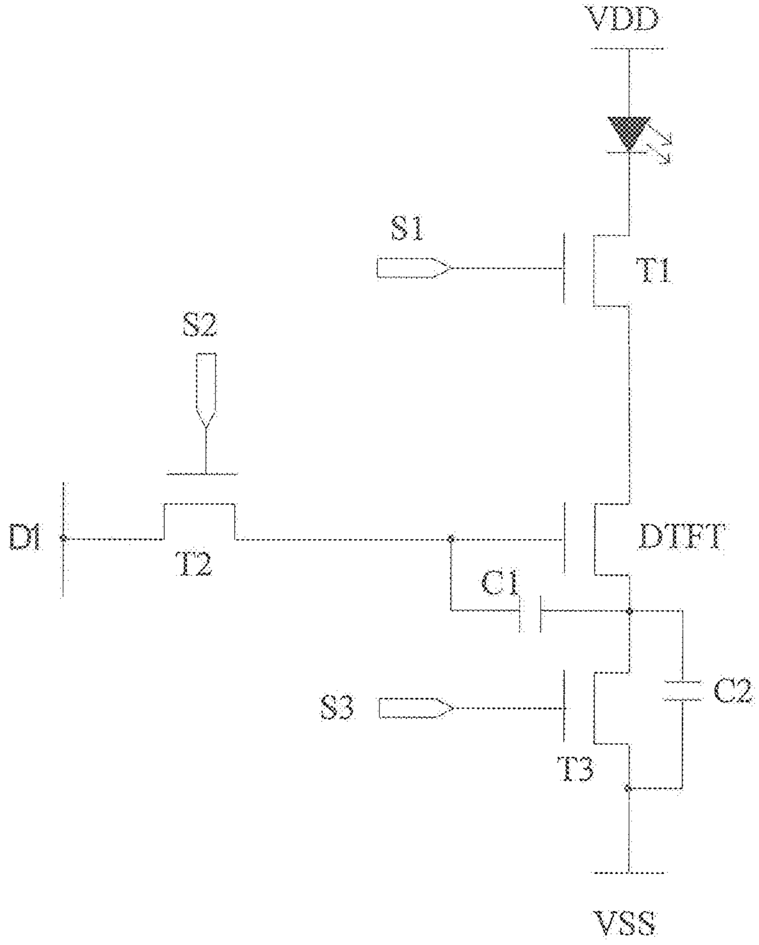
FIG. 3A is a schematic view showing the structure of the pixel circuit according to one embodiment of the present disclosure.

It is to be noted that, in FIG. 3A, the drain electrode of the first switch transistor T1 is coupled to the first end of the voltage source, i.e., VDD, via the light-emitting element 1. Of course, it may also be directly coupled to VDD, as long as the first switch transistor T1 can control an ON state of a branch where VDD, VSS, the light-emitting element 3, the driving transistor DTFT and the second capacitor C2 are located. As a result, the second capacitor C2 may be charged, so that the potential for the source electrode of the driving transistor DTFT increases to the potential capable of automatically turning off the driving transistor DTFT, and the threshold voltage of the driving transistor DTFT is acquired by charging the second capacitor C2.

A gate electrode of the second switch transistor T2 is coupled to the second gate signal source S2 for outputting the scanning voltage signal, a drain electrode thereof is coupled to the data signal source and the reference signal source, and a source electrode thereof is coupled to the gate electrode of the driving transistor DTFT and the first end of the first capacitor C1, as shown in FIG. 3A. The second gate signal source S2 controls ON and OFF states of the second switch transistor T2. When the second switch transistor T2 is turned on, the reference signal source inputs a reference voltage to the gate electrode of the driving transistor DTFT for setting the constant potential for the gate electrode thereof or the data signal source inputs the data voltage to the gate electrode of the driving transistor DTFT for driving the light-emitting element to emit light.

To be specific, when the reference signal source inputs the reference voltage to the gate electrode of the driving transistor DTFT for setting the constant potential for the gate electrode so that the potential for the source electrode of the driving transistor increases to the potential capable of automatically turning off the driving transistor DTFT, the first capacitor C1 pre-stores the threshold voltage of the driving transistor DTFT. When the data signal source inputs the data voltage to the gate electrode of the driving transistor DTFT for driving the light-emitting element 3 to emit light, the first capacitor C1 stores the data voltage for driving the light-emitting element 3 to emit light.

Further, the light-emitting controlling module includes a third switch transistor T3 and a third gate signal source S3 for outputting tire light-emitting controlling signal, as shown in FIG. 3A. A gate electrode of the third switch transistor T3 is coupled to the third gate signal source S3, a source electrode thereof is coupled to the second end of the voltage source, i.e., VSS, and the second end of the second capacitor C2, and a drain electrode thereof is coupled to the source electrode of the driving transistor DTFT and the first end of the second capacitor. The third switch transistor T3 can control ON and OFF states of a branch where the driving transistor DTFT and the second end of the voltage scarce are located, and control, together with the first switch transistor T1, an ON state of a branch where the driving transistor DTFT and the light-emitting element 3 are located, so as to drive the light-emitting element 3 to emit light or charge the second capacitor C2.

To be specific, when the third switch transistor T3 is turned on, a branch where the first end of the voltage source, i.e., VDD, the light-emitting element 3, the first switch transistor T1, the driving transistor DTFT and the second end of the voltage source, i.e., VSS, are located is turned on, and the driving transistor DTFT drives the light-emitting element 3 to emit light when it outputs the driving current. When the data is written into the pixel circuit, the third switch transistor T3 is turned off, and the first switch transistor T1 controls the ON state of a branch where the first end of the voltage source, i.e., VDD, the second end of the voltage source, i.e., VSS, the light-emitting element 3, the driving transistor DTFT and the second capacitor C2 are located, so as to charge the second capacitor C2.

Further, the reference signal source is mainly used to provide the reference voltage, and the data signal source D1 is mainly used to provide the data voltage. The reference voltage and the data voltage are transferred in a time-sharing manner. Hence, in this embodiment, the reference signal source and the data signal source D1 are preferably set as an identical signal terminal (also called as an identical signal source). The reference voltage or the data, voltage may be inputted to the gate electrode of the driving transistor DTFT in a time-sharing manner via the identical signal terminal, and as a result it is able to reduce the number of the signal sources, thereby to simplify the circuit.

The following description is given by taking the data signal source D1 as an example. The pixel circuit in this embodiment comprises four transistors (i.e., the switch transistors T1, T2 and T3 and the driving transistor DTFT for generating the driving current and driving the light-emitting element to emit light), two capacitors (C1 and C2), three gate signal sources (S1, S2 and S3), the data signal source D1, the light-emitting element, and the voltage source, as shown in FIG. 3A.

It is to be noted that in this embodiment, the reference voltage and the data voltage are preferably transferred via the data signal source D1 in a time-sharing manner. Of course, they may also be transferred separately via different signal terminals, or controlled by different switch transistors, which is not particularly defined in this embodiment.

For example, the following mode may be used so as to control the input of the reference voltage and the data voltage via different switch transistors. The second switch transistor T2 inputs the data voltage, the gate electrode of which is coupled to the second gate signal source S2 (e.g., a scanning voltage), a drain electrode of which is coupled to the data signal source, and a source electrode of which is coupled to the gate electrode of the driving transistor DTFT and the first end of the first capacitor C1. A fourth switch transistor T4 (not shown) is added so as to input the reference voltage, a gate electrode of which is coupled to a fourth gate signal source S4, a drain electrode of which is coupled to the reference signal source, and a source electrode of which is coupled to the gate electrode of the driving transistor DTFT and the first end of the first capacitor C1. The operation sequences of the second gate signal source S2 and the fourth gate signal source S4 are not particularly defined, as long as they can cooperate with each other so as to control the ON and OFF states of T2 and T4, and output the desired reference voltage and data voltage. In this embodiment, the pixel circuit merely comprises four transistors, two capacitors, one light-emitting element, the data signal source D1, a signal control line and the voltage source. The data signal source D1 inputs the reference voltage and the data voltage to the gate electrode of the driving transistor in a time-sharing manner, and through the ON and OFF states of the switch transistors, controls the second capacitor to pre-store the potential for the source electrode as the potential capable of automatically turning off the driving transistor and controls the first capacitor to pre-store the threshold voltage of the driving transistor. The data voltage stored by the first capacitor can drive the driving transistor to output the driving current so as to drive the light-emitting element to emit light. When the light-emitting element is driven to emit light, the threshold voltage of the driving transistor DTFT may be compensated by the threshold voltage of the driving transistor DTFT pre-stored by the first capacitor. As a result, the driving current for driving the light-emitting element to emit light is irrelevant to the threshold voltage of the driving transistor, and it is able to improve the brightness uniformity of the image in the array substrate.

Third Embodiment

In this embodiment, a method for driving the pixel circuit of the first or second embodiment is provided. In this method, the compensating sub-circuit 2 is charged by the controlling sub-circuit 1 under the control of the scanning voltage signal and the charging signal, so that the compensating sub-circuit 2 sets the constant potential for the gate electrode of the driving transistor DTFT and pre-stores the threshold voltage of the driving transistor DTFT.

Further, the controlling sub-circuit 1, under the control of the light-emitting controlling signal, compensates for the threshold voltage of the driving transistor DTFT with the threshold voltage pre-stored by the compensating sub-circuit, and controls the driving transistor DTFT to drive the light-emitting element 3 to emit light.

To be specific, the compensating sub-circuit 2 includes the first capacitor C1 and the second capacitor C2. The following mode may be used so that the compensating sub-circuit 2 sets the constant potential for the gate electrode of the driving transistor DTFT and pre-stores the threshold voltage of the driving transistor DTFT. The controlling sub-circuit 1 inputs the reference voltage to the driving transistor DTFT for setting the constant potential for the gate electrode, and controls the second capacitor C2 coupled to the source electrode of the driving transistor DTFT to be charged, so that the potential for the source electrode of the driving transistor DTFT increases to the potential capable of turning off the driving transistor DTFT, and the first capacitor C1 stores the threshold voltage of die driving transistor DTFT.

Further, after the capacitor C1 stores the threshold voltage of the driving transistor DTFT, the controlling sub-circuit 1 inputs the data voltage to the gate electrode of the driving transistor DTFT for driving the light-emitting element 3 to emit light, so as to store the data voltage by the first capacitor C1, thereby to drive the driving transistor DTFT to output the driving current and drive the light-emitting element 3 to emit light.

Further, the controlling sub-circuit 1 includes the charging module 11, the light-emitting controlling module 12 and the voltage source 13. The charging module 11 includes the first gate signal, source S1, the first switch transistor T1, the second gate signal source S2, the second switch transistor T2, the voltage source, the data signal source and the reference signal source. The light-emitting controlling module 12 includes the third switch transistor T3 and the third gate signal source S3 for outputting the light-emitting controlling signal.

When the first switch transistor T1, the second switch transistor T2 and the third switch transistor T3 are all P-type TFTs, the data voltage outputted by the data signal source is not greater than the reference voltage outputted by the reference voltage source.

When the first switch transistor T1, the second switch transistor T2 and the third switch transistor T3 are all N-type TFTs, the data voltage outputted by the data signal source is not less than the reference voltage outputted by the reference voltage source.

According to the method of this embodiment, the second capacitor is charged, so that the potential for the source electrode is pre-stored as the potential capable of automatically turning off the driving transistor, and the first capacitor pre-stores the threshold voltage of the driving transistor. The data voltage stored by the first capacitor can drive the driving transistor so as to output the driving current and drive the light-emitting element to emit light. When the light-emitting element is driven to emit light, the threshold voltage of the driving transistor DTFT is compensated by the threshold voltage of the driving transistor pre-stored by the first capacitor. As a result, the driving current for driving the light-emitting element to emit light is irrelevant to the threshold voltage of the driving transistor, and it is able to improve the brightness uniformity of the image in the array substrate.

Fourth Embodiment

The method for driving the pixel circuit in FIG. 3A will be described hereinafter in conjunction with the sequence diagram in FIG. 3B.

In this embodiment, the controlling sub-circuit including three switch transistors, one data signal source D1 and three gate signal sources is taken as an example. FIG. 3B is a sequence diagram of the pixel circuit in FIG. 3A where the four transistors are all N-type TFTs. For the P-type TFTs, the level signals are opposite in the operation sequence, which will not be repeated herein.

First Stage

Figure 4A:
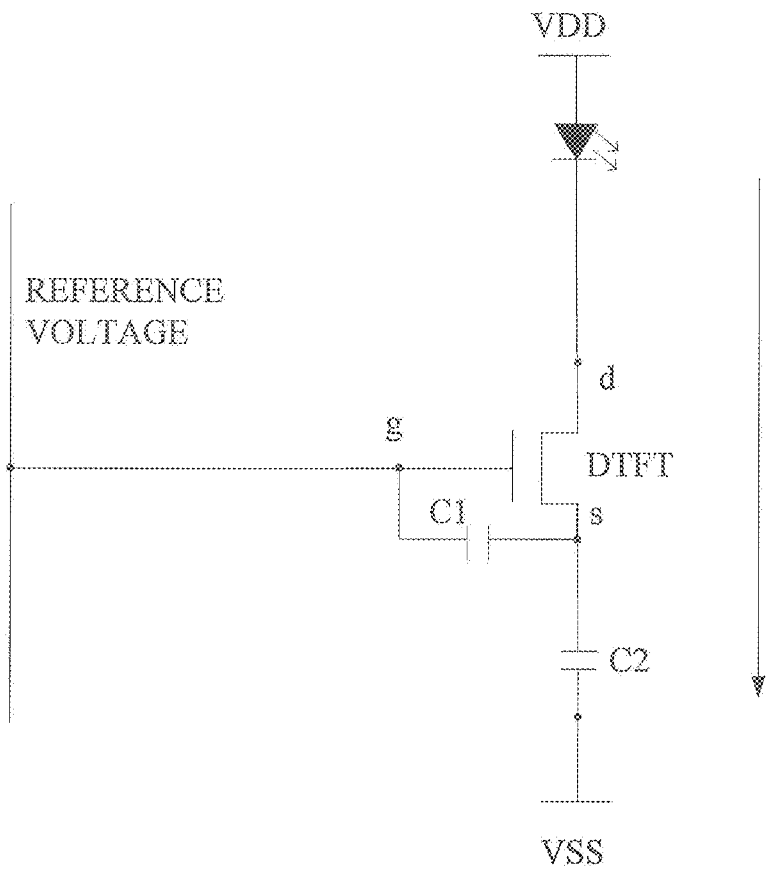
FIGS. 4A-4C are equivalent circuit diagrams of the pixel circuit in FIG. 3B at different stages.

The first gate signal source S1 and the second gate signal source S2 are both at a high level and the third gate signal source S3 is at a low level. The first gate signal source S1 and the second gate signal source 32 are valid, so that die first switch transistor T1 and the second transistor T2 are turned on. The third gate signal source S3 is invalid, so that the third switch transistor T3 is turned off. The equivalent circuit is shown in FIG. 4A.

At the first stage, the data signal source D1 transfers the reference voltage Vref. In this embodiment, the reference voltage Vref shall meet the following requirements: Vref=Vdata(min) and Vref−VSS>Vthd, where Vthd represents the threshold voltage of DTFT, and Vdata(min) represents a minimum grayscale voltage in the data voltages. In other words, in this embodiment, the grayscale voltage Vdata in the data voltages is not less than Vref, and this reference voltage can enable the driving transistor DTFT to be in the ON state but not be turned off.

Of course, if the DTFT is a P-type transistor, the reference voltage Vref shall meet the following requirement: Vref=Vdata/max). In other words, the data voltage Vdata shall be not greater than the reference voltage Vref, and this reference voltage can enable the driving transistor DTFT to be in the ON state but not be turned off.

Further, at the first stage, the first switch transistor T1 is turned on and the third switch transistor T3 is turned off, so the second capacitor C2 is charged continuously with the current outputted from the voltage source and flowing through the driving transistor DTFT, and a potential at point s will increase continuously, until it reaches Vref−Vthd so as to automatically turn off the driving transistor DTFT.

Further, the second switch transistor T2 is turned on, so as to input the reference voltage outputted by the data signal source D1 to the gate electrode of the driving transistor DTFT, thereby to charge the first capacitor. At this time, in the first capacitor, a potential at point g is Vref and a potential at point s is Vref−Vthd, so a voltage across the first capacitor is Vthd. In other words, the threshold voltage of the driving transistor is stored by the first capacitor.

Second Stage

Figure 4B:
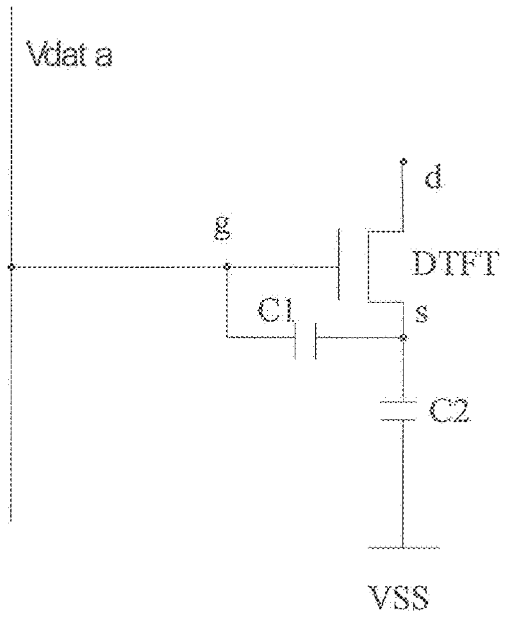

The second gate signal source S2 is at a high level, and the first gate signal source S1 and the third gate signal source S3 are at a low level. At this time, only the second gate signal source S2 is valid, while the first gate signal source S1 and the third gate signal source S3 are both invalid. The second switch transistor T2 is turned on, and the first switch transistor T1 and the third switch transistor T3 are both turned off. The equivalent circuit is shown in FIG. 4B.

At the second stage, the voltage outputted by the data signal source D1 is transited from the reference voltage to the data voltage that is not less than the reference voltage. At this time, the first switch transistor T1 and the third switch transistor T3 are turned off, and point s is in a dangling state, so the voltage transition on the data signal source D1 is coupled to point s via the first capacitor C1, and the potential at point s is transited to Vs=Vref=Vthd+(Vdata−Vref)*C1/(C1+C2). At this time, the voltage across the first capacitor C1 is Vc1=Vdata−Vs=Vdata−[Vref−Vthd+(Vdata−Vref)*C1/(C1+C2)]=(Vdata−Vref)*C2/(C1+C2)+Vthd.

Third Stage

Figure 4C:
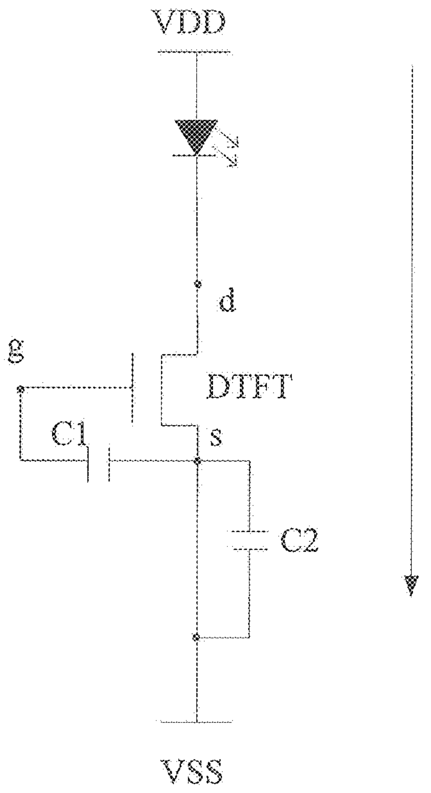

The second gate signal source S2 is at a low level, and the first gate signal source S1 and the third gate signal source S3 are both at a high level. At this time, the first gate signal source S1 and the third gate signal source S3 are both valid so that the first switch transistor T1 and the third switch transistor T3 are turned on, and the second gate signal source S2 is invalid so that the second switch transistor T2 is turned off. The equivalent circuit is shown in FIG. 4C.

At the third stage, the second switch transistor T2 is turned off, and the end of the first capacitor C1 coupled to the gate electrode of the driving transistor DTFT is in a dangling state, so a gate-to-source voltage Vgs of the driving transistor DTFT is equal to the voltage across of the first capacitor C1, regardless of any change of the potential at point s, i.e., Vgs=Vc1=(Vdata−Vref)*C2/(C1+C2)+Vthd. At this time, if the data voltage output by the data signal source D1 is the minimum grayscale voltage Vdata(min), Vdata is equal to Vref, so Vgs=Vc1=Vthd. Hence, a saturation current flowing through the driving transistor DTFT, i.e., a light-emitting current of the light-emitting element, is Ioled=kd(Vgs−Vthd)2=k(Vthd−Vthd)2=0. In other words, when the data voltage is the minimum grayscale voltage, the light-emitting element 3 does not emit light. Of course, if DTFT is a P-type TFT and the data voltage is Vdata(min), the light-emitting current is 0, i.e., the light-emitting element 3 does not emit light.

If the data, voltage outputted by the data signal source D1 is not the minimum grayscale voltage, Vdata is greater than Vref, and at this time, the saturation current flowing through the driving transistor DTFT, i.e., the light-emitting current of the light-emitting element, is Ioled=kd(Vgs−Vthd)$^2$=kd[(Vdata=Vref)*C2/(C1+C2)+Vthd−Vthd]$_2$=kd[(Vdata−Vref)*C2/(C1+C2)]$^2$, where kd represents a constant associated with a process and driving design, and Vthd represents the threshold voltage of the driving transistor DTFT. It follows that, the current is merely associated with the data voltage, the reference voltage, the first capacitor C1 and the second capacitor C2, but irrelevant to the threshold of the driving transistor DTFT in other words, the display brightness at any position of the array substrate is no longer relevant to the threshold voltage of the driving transistor DTFT, but merely associated with the data voltage, the reference voltage, the first capacitor C1 and the second capacitor C2. As a result, it is able to provide uniform display brightness in a better manner than conventional methods.

In this embodiment, the first switch transistor T1, the second switch transistor T2 and the third switch transistor T3 may be of the same type, or different types. However, in order to simplify the manufacturing process, preferably they are all P-type TFTs or N-type TFTs.

If the first switch transistor T1, the second switch transistor T2 and the third switch transistor T3 are all P-type TFTs, the data voltage Vdata is not greater than the reference voltage Vref, and if they are all N-type TFTs, the data voltage Vdata is not less than the reference voltage Vref.

Further, in this embodiment, the second switch transistor T2 is of a type different from the third switch transistor T3. At this time, the type of the first switch transistor T1 is not particularly defined herein, and may be set in accordance with the practical need. For example, the first switch transistor T1 may be of a type identical to, or different from, the second switch transistor T2, as long as it can, in accordance with the corresponding sequence of the first gate signal source S1, cooperate with the second switch transistor T2 and the third switch transistor T3 so as to achieve the above-mentioned functions.

Figure 5:
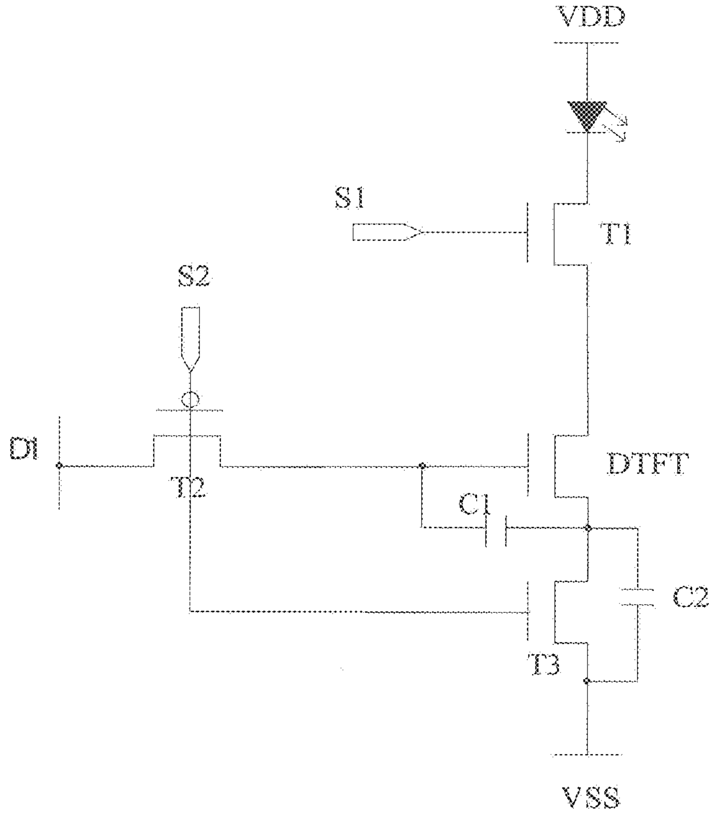
FIG. 5 is another schematic view showing the structure of the pixel circuit, according to one embodiment, of the present disclosure.

Further, the first switch transistor T1 and the third switch transistor T3 are of the same type, and the second switch transistor T2 is of a type different from the first switch transistor T1 and the third switch transistor T3, as shown in FIG. 5.

Figure 3B:
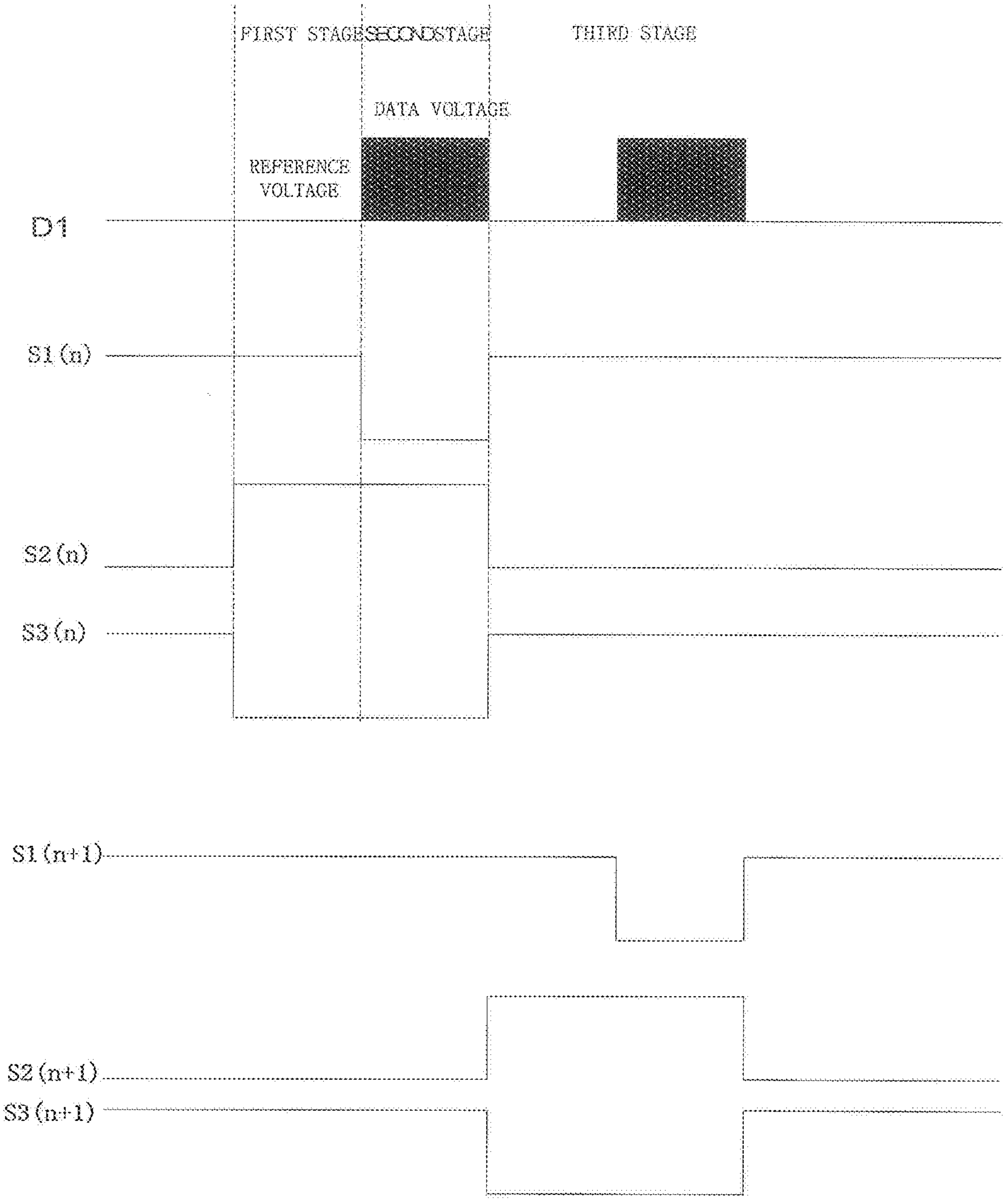
FIG. 3B is a sequence diagram of the pixel circuit in FIG. 3A.

Further, in FIG. 3B, the second gate signal source S2 and the third gate signal source S3 have opposite levels at different stages. As a result, in this embodiment, the second switch transistor T2 may preferably be of a type opposite to the third switch transistor T3, and the third gate signal source S3 and the second gate signal source S2 may be set as the same gate signal source, so as to simplify the circuit, as shown in FIG. 5.

According to the pixel circuit and its driving method, the reference voltage and the data voltage are inputted by the data signal source D1 in a time-sharing manner, the second capacitor is charged so as to acquire the threshold voltage of the driving transistor DTFT, and the threshold voltage of the driving transistor is stored in the first capacitor. The threshold voltage of the driving transistor DTFT is compensated by the threshold voltage of the driving transistor pre-stored in the first capacitor. The driving current is no longer relevant to the threshold voltage of the driving transistor DTFT, but merely associated with the data voltage, the reference voltage, the first capacitor C1 and the second capacitor C2. As a result, it is able to provide uniform display brightness in a better manner.

Fifth Embodiment

Figure 6:
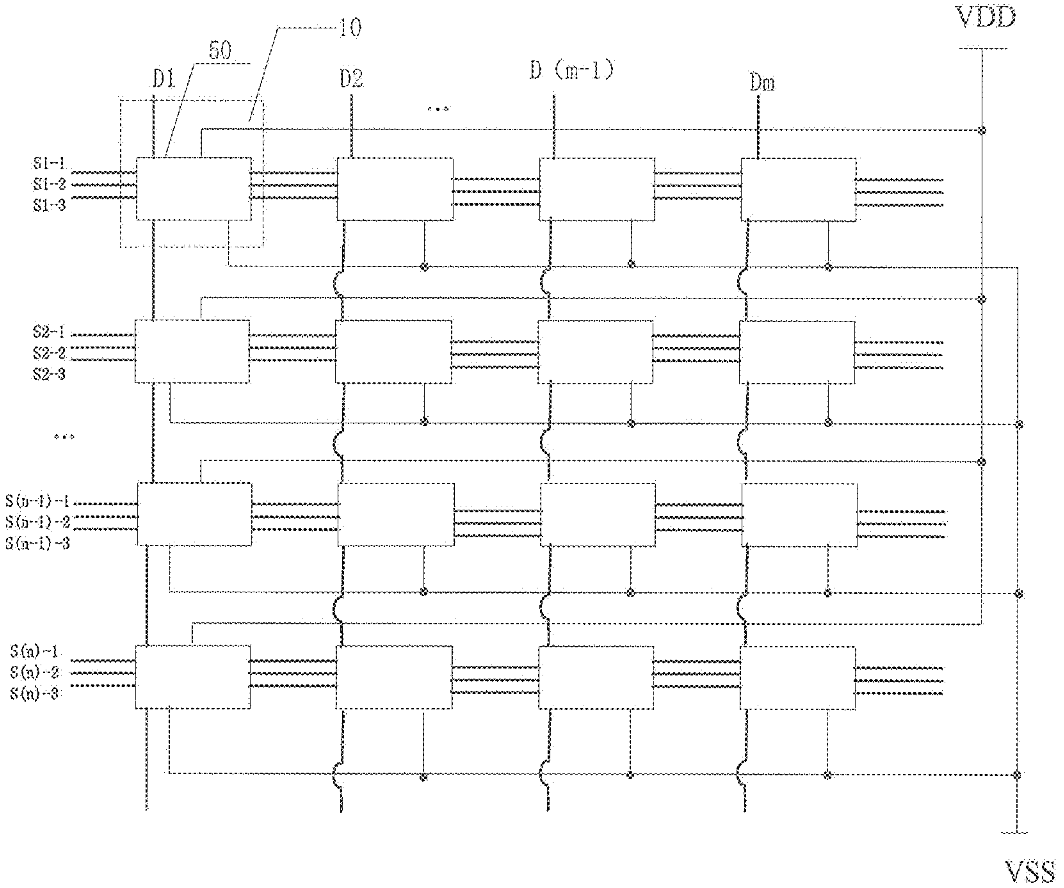
FIG. 6 is a schematic view showing an array substrate according to one embodiment of the present disclosure.

In this embodiment, an array substrate, as shown in FIG. 6, comprises the pixel circuit 50 of the above embodiments.

To be specific, as shown in FIG. 6, the array substrate comprises:

a plurality of gate lines arranged in a row direction, e.g., S1-1 S1-2 S1-3, S2-1 S2-2 S2-3, . . . , Sn-1 Sn-2 Sn-3 as shown in FIG. 6;

a plurality of data lines arranged in a column direction, e.g., D1, D2, . . . , Dm as shown in FIG. 6; and a plurality of pixel units 10 arranged in a matrix form and each being defined by a set of gate lines and one data line (each pixel unit 10 being defined by three gate lines (e.g., S1-1 S1-2 S1-3) and one data line (e.g., D1)), where n and m are each a positive integer.

At least one of the pixel units includes the pixel circuit 50 of the above embodiments. The number of the gate lines corresponds to the number of the gate signal sources of the switch transistors desired for the pixel circuit 50.

Preferably, each pixel unit includes the pixel circuit 50 of the above embodiment. For the controlling sub-circuits of the pixel circuits 50 in the same row, the respective gate electrodes of the switch transistors having the same gate signal source are coupled to the same gate line. The controlling sub-circuits of the pixel circuits 50 in the same column are coupled to the same data line.

In the array substrate, the plurality of pixel circuits is coupled to the voltage source via a power line. The voltage source can output a voltage desired for driving the light-emitting element. For example, the first end of the voltage source outputs the DC high level VDD, and the second end of the voltage source outputs the DC low level VSS.

Preferably, in this embodiment, by taking one pixel unit 10 as example, the gate signal source S2 of the controlling sub-circuit in the pixel unit is coupled to the gate electrode of the second switch transistor T2 via a second gate line S1-2 of the pixel unit.

Further, the first gate signal source S1 and the third gate signal source S3 of the controlling sub-circuit may be coupled to the gate electrode of the first switch transistor T1 and the gate electrode of the third switch transistor T3 via additional signal lines (i.e., die first gate line S1-1 and a third gate line S1-3), respectively. They may also be set in accordance with the practical need and the types of the switch transistors. For example, the second switch transistor T2 and the third switch transistor T3 are of different types, and the third gate signal source S3 and the second gate signal source S2 are set as the same gate signal source. In other words, in the same pixel unit the gate electrode of the second gate signal source S2 may be coupled to the gate electrode of the third gate signal source S3 on the gate line. Further, the data signal source D1 and the reference signal source are coupled to the drain electrode of the second switch transistor T2 via the data line.

According to the array substrate of this embodiment, the pixel circuit comprises the controlling sub-circuit, the compensating sub-circuit, the driving transistor and the light-emitting element. The compensating sub-circuit includes the first and second capacitors, the controlling sub-circuit can control the first and second capacitors to be charged, and the threshold voltage of the driving transistor and the data voltage for driving the light-emitting element to emit light are stored by the first capacitor in a time-sharing manner. The threshold voltage of the driving transistor DTFT is compensated by the threshold voltage of the driving transistor DTFT pre-stored by the first capacitor when the driving transistor drives the light-emitting element to emit light. As a result, the driving current for driving the light-emitting element to emit light is irrelevant to the threshold voltage of the driving transistor, and it is able to improve the brightness uniformity of an image in the array substrate.

Sixth Embodiment

In this embodiment, a display device comprising array substrate of the fifth embodiment is provided. The other structures of the display device are the same as those in the prior art, and they will not be repeated herein.

It is to be appreciated that, the display device may be an OLED panel, an OLED display, an OLED TV, or an electronic paper.

According to the display device of this embodiment, the pixel circuit of the array substrate comprises the controlling sub-circuit, the compensating sub-circuit, the driving transistor and the light-emitting element. The compensating sub-circuit includes the first and second capacitors, the controlling sub-circuit can control the first and second capacitors to be charged, and the threshold voltage of the driving transistor and the data voltage for driving the light-emitting element to emit light are stored by the first capacitor in a time-sharing manner. The threshold voltage of the driving transistor DTFT is compensated by the threshold voltage of the driving transistor DTFT pre-stored by the first capacitor when the driving transistor drives the light-emitting element to emit light. As a result the driving current for driving the light-emitting element to emit light is irrelevant to the threshold voltage of the driving transistor, and it is able to improve the brightness uniformity of an image in the array substrate.

Obviously, a person skilled in the art may make modifications and variations to the present invention without departing from the spirit and scope of the present invention. If these modifications and variations fall within the scope of the appended claims and the equivalents thereof, the present invention also intends to include these modifications and variations.

What is claimed is:

1. An array substrate, comprising a plurality of pixel circuits arranged in a matrix form, wherein each pixel circuit comprises a controlling sub-circuit, a compensating sub-circuit, a driving transistor and a light-emitting element, wherein the controlling sub-circuit is configured to, under the control of a scanning voltage signal and a charging signal, charge the compensating sub-circuit, and under the control of a light-emitting controlling signal, control the driving transistor so as to drive the light-emitting element to emit light, and the compensating sub-circuit is configured to, under the control of the controlling sub-circuit, set a constant potential for a gate electrode of the driving transistor, and pre-store a threshold voltage of the driving transistor, so as to compensate for the threshold voltage of the driving transistor when the driving transistor drives the light-emitting element to emit light, wherein the compensating sub-circuit comprises a first capacitor and a second capacitor, a first end of the first capacitor is coupled to the gate electrode of the driving transistor and the controlling sub-circuit, and a second end thereof is coupled to a source electrode of the driving transistor, a first end of the second capacitor is coupled to a source electrode of the driving transistor, and a second end thereof is coupled to the controlling sub-circuit, and the second capacitor is charged under the control of the controlling sub-circuit, so that a potential for a source electrode of the driving transistor increases to a potential capable of automatically turning off the driving transistor, and the first capacitor pre-stores the threshold voltage capable of automatically turning off the driving transistor, wherein the controlling sub-circuit comprises a charging module, a light-emitting controlling module and a voltage source, the charging module is coupled to a first end of the voltage source, the gate electrode of the driving transistor and the first end of the first capacitor, the light-emitting controlling module is coupled to a second end of the voltage source and the source electrode of the driving transistor, the charging module is configured to receive a voltage source signal and a reference voltage signal for setting the constant potential for the gate electrode of the driving transistor so as to control the voltage source to charge the second capacitor, so that the potential for the source electrode of the driving transistor increases to the potential capable of automatically turning off the driving transistor, and the first capacitor pre-stores the threshold voltage capable of automatically turning off the driving transistor when the potential for the source electrode of the driving transistor increases to the potential capable of automatically turning off the driving transistor, the charging module is further configured to receive a data voltage signal for driving the light-emitting element to emit light, so as to control the first capacitor to store a data voltage, and the light-emitting controlling module is configured to, under the control of the light-emitting controlling signal, receive the voltage source signal and control the driving transistor so as to drive the light-emitting element to emit light, wherein the charging module comprises a first switch transistor, a first gate signal source for outputting the charging signal, a second switch transistor, a second gate signal source for outputting the scanning voltage signal, a data signal source, and a reference signal source, a gate electrode of the first switch transistor is coupled to the first gate signal source, a drain electrode thereof is coupled to a first end of the voltage source, and a source electrode thereof is coupled to a drain electrode of the driving transistor, a second end of the voltage source is coupled to the second end of the second capacitor, and a gate electrode of the second switch transistor is coupled to the second gate signal source, a drain electrode thereof is coupled to the data signal source and the reference signal source, and a source electrode thereof is coupled to the gate electrode of the driving transistor and the first end of the first capacitor, wherein the light-emitting controlling module comprises a third switch transistor and a third gate signal source for outputting the light-emitting controlling signal, and a gate electrode of the third switch transistor is coupled to the third gate signal source, a source electrode thereof is coupled to the second end of the voltage source and the second end of the second capacitor, and a drain electrode thereof is coupled to the source electrode of the driving transistor and the first end of the second capacitor, wherein the first and third switch transistors are of the same type, while the second switch transistor is of a different type from the first and third switch transistors, the second gate signal source is identical to the third gate signal source, and each of the plurality of pixel circuits is of a 4T2C circuit structure, which only consists of the first switch transistor, the second switch transistor, the third switch transistor, the driving transistor, the first capacitor, and the second capacitor.

2. The array substrate according to claim 1, wherein the first, second and third switch transistors are all P-type thin film transistors (TFTs) or N-type TFTs.

3. The array substrate according to claim 1, wherein the data signal source and the reference signal source are outputted via an identical signal terminal.

4. The array substrate according to claim 1, wherein the data signal source and the reference signal source are outputted via an identical signal terminal.

5. A display device comprising a array substrate, wherein the array substrate comprises a plurality of pixel circuits arranged in a matrix form, and each pixel circuit comprises a controlling sub-circuit, a compensating sub-circuit, a driving transistor and a light-emitting element, wherein the controlling sub-circuit is configured to, under the control of a scanning voltage signal and a charging signal, charge the compensating sub-circuit, and under the control of a light-emitting controlling signal, control the driving transistor so as to drive the light-emitting element to emit light, and the compensating sub-circuit is configured to, under the control of the controlling sub-circuit, set a constant potential for a gate electrode of the driving transistor, and pre-store a threshold voltage of the driving transistor, so as to compensate for the threshold voltage of the driving transistor when the driving transistor drives the light-emitting element to emit light, wherein the compensating sub-circuit comprises a first capacitor and a second capacitor, a first end of the first capacitor is coupled to the gate electrode of the driving transistor and the controlling sub-circuit, and a second end thereof is coupled to a source electrode of the driving transistor, a first end of the second capacitor is coupled to a source electrode of the driving transistor, and a second end thereof is coupled to the controlling sub-circuit, and the second capacitor is charged under the control of the controlling sub-circuit, so that a potential for a source electrode of the driving transistor increases to a potential capable of automatically turning off the driving transistor, and the first capacitor pre-stores the threshold voltage capable of automatically turning off the driving transistor, wherein the controlling sub-circuit comprises a charging module, a light-emitting controlling module and a voltage source, the charging module is coupled to a first end of the voltage source, the gate electrode of the driving transistor and the first end of the first capacitor, the light-emitting controlling module is coupled to a second end of the voltage source and the source electrode of the driving transistor, the charging module is configured to receive a voltage source signal and a reference voltage signal for setting the constant potential for the gate electrode of the driving transistor so as to control the voltage source to charge the second capacitor, so that the potential for the source electrode of the driving transistor increases to the potential capable of automatically turning off the driving transistor, and the first capacitor pre-stores the threshold voltage capable of automatically turning off the driving transistor when the potential for the source electrode of the driving transistor increases to the potential capable of automatically turning off the driving transistor, the charging module is further configured to receive a data voltage signal for driving the light-emitting element to emit light, so as to control the first capacitor to store a data voltage, and the light-emitting controlling module is configured to, under the control of the light-emitting controlling signal, receive the voltage source signal and control the driving transistor so as to drive the light-emitting element to emit light, wherein the charging module comprises a first switch transistor, a first gate signal source for outputting the charging signal, a second switch transistor, a second gate signal source for outputting the scanning voltage signal, a data signal source, and a reference signal source, a gate electrode of the first switch transistor is coupled to the first gate signal source, a drain electrode thereof is coupled to a first end of the voltage source, and a source electrode thereof is coupled to a drain electrode of the driving transistor, a second end of the voltage source is coupled to the second end of the second capacitor, and a gate electrode of the second switch transistor is coupled to the second gate signal source, a drain electrode thereof is coupled to the data signal source and the reference signal source, and a source electrode thereof is coupled to the gate electrode of the driving transistor and the first end of the first capacitor, wherein the light-emitting controlling module comprises a third switch transistor and a third gate signal source for outputting the light-emitting controlling signal, and a gate electrode of the third switch transistor is coupled to the third gate signal source, a source electrode thereof is coupled to the second end of the voltage source and the second end of the second capacitor, and a drain electrode thereof is coupled to the source electrode of the driving transistor and the first end of the second capacitor, wherein the first and third switch transistors are of the same type, while the second switch transistor is of a different type from the first and third switch transistors, the second gate signal source is identical to the third gate signal source, and each of the plurality of pixel circuits is of a 4T2C circuit structure, which only consists of the first switch transistor, the second switch transistor, the third switch transistor, the driving transistor, the first capacitor, and the second capacitor.

6. The display device according to claim 5, wherein the first, second and third switch transistors are all P-type thin film transistors (TFTs) or N-type TFTs.

7. The display device according to claim 5, wherein the data signal source and the reference signal source are outputted via an identical signal terminal.

8. The display device according to claim 5, wherein the data signal source and the reference signal source are outputted via an identical signal terminal.

9. A method for driving the display device according to claim 5, comprising the steps of:

charging by a controlling sub-circuit, under the control of a scanning voltage signal and a charging signal, a compensating sub-circuit, so that the compensating sub-circuit sets a constant potential for a gate electrode of a driving transistor and pre-stores a threshold voltage of the driving transistor; and compensating by the controlling sub-circuit, under the control of a light-emitting controlling signal, for a threshold voltage of the driving transistor with the pre-stored threshold voltage and controlling the driving transistor so as to drive a light-emitting element to emit light.

10. The method according to claim 9, wherein the compensating sub-circuit comprises a first capacitor and a second capacitor, and the step of charging the compensating sub-circuit so that the compensating sub-circuit sets the constant potential for the gate electrode of the driving transistor and pre-stores the threshold voltage of the driving transistor comprises:

inputting, by the controlling sub-circuit, a reference voltage to the gate electrode of the driving transistor for setting the constant potential, and controlling the second capacitor coupled to a source electrode of the driving capacitor to be charged, so that a potential for the source electrode of the driving transistor increases to a potential capable of automatically turning off the driving transistor and the first capacitor stores the threshold voltage of the driving transistor.

* * * * *